Feb. 1, 1927.

J. BARRON 1,616,408

OVERFLOW DEVICE FOR COOKING VESSELS

Filed Dec. 20, 1924

INVENTOR
John Barron
BY
ATTORNEY

Patented Feb. 1, 1927.

1,616,408

UNITED STATES PATENT OFFICE.

JOHN BARRON, OF YONKERS, NEW YORK.

OVERFLOW DEVICE FOR COOKING VESSELS.

Application filed December 20, 1924. Serial No. 757,103.

This invention relates generally to vessels used in cooking, or in heating liquids of a viscous nature, the invention having more particular reference to a vessel provided with means for receiving liquid that may boil over.

The invention has for an object to provide a detachable top element for a vessel of this sort which may be applied when desired to the vessel to receive overflow liquid.

For further comprehension of the invention, and of the objects and advantages thereof, reference will be had to the following description and accompanying drawing, and to the appended claims in which the various novel features of the invention are more particularly set forth.

Figure 2:
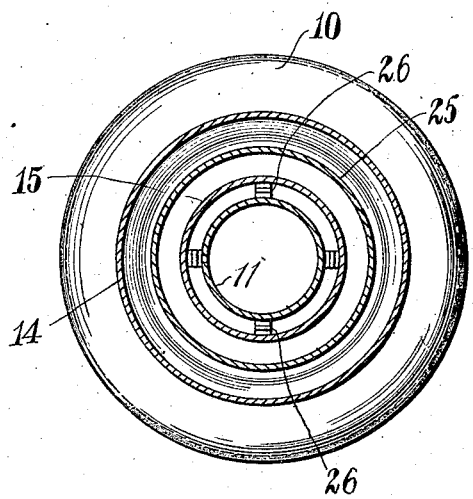
Fig. 2 is a horizontal sectional view taken on the line 2—2 of Fig. 1.
Figure 1:
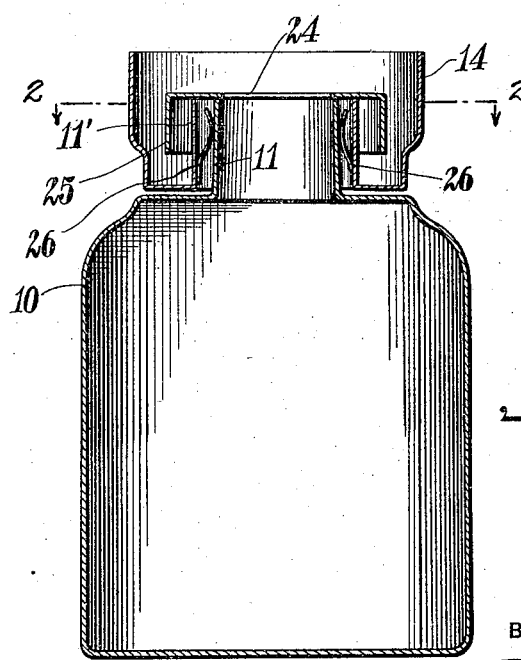
Fig. 1 is a central vertical sectional view showing my improved attachment in place on a working vessel.

Referring now to the drawing, the reference numeral 10 indicates a vessel, in which liquids may be heated or food cooked, this vessel having an upwardly projecting neck or flange 11 that surrounds the mouth of the vessel.

My improved overflow attachment comprises a cup-like receptacle 14, with an upturned flange 11' on the bottom of the overflow receptacle having a flat ring 24 on its upper end that rests upon the top of the neck 11 of the vessel 10, a cylindrical member 25 depending from the outer side of the ring 24. The flange 11' of the overflow receptacle has attached to the inner side thereof a number of springs 26 that bear on the neck 11 and serve to centre the overflow vessel on the main vessel. These springs also function to adapt the overflow device for securely fitting upon vessels having different neck diameters.

Having thus described my invention, what I claim as new and desire to protect by Letters Patent of the United States is as follows:—

1. An overflow device for cooking vessels comprising a receptacle formed with an opening in the bottom thereof surrounded by an upturned flange, and a flat inwardly extending ring on the top of said flange adapted to rest upon the top of the said cooking vessel.

2. An overflow device for cooking vessels comprising a receptacle formed with an opening in the bottom thereof surrounded by an upturned flange, and a flat inwardly extending ring on the top of said flange adapted to rest upon the top of the said cooking vessel, and springs secured to the said flange and adapted to bear on the said vessel to centre the overflow device thereon.

3. The combination, in a supplementary overflow vessel detachably mounted on the top of a main vessel, of an upturned circular flange from the bottom of the said overflow vessel, and a number of springs spaced along the inner face of said circular flange, to bear against the neck of the said main vessel to securely attach and center the overflow vessel upon the main vessel.

4. The combination, in a supplementary overflow vessel detachably mounted on the top of a main vessel, of an upturned circular flange from the said overflow vessel, and a number of springs spaced along the inner face of said circular flange, to bear against the neck of the said main vessel to securely attach and center the overflow vessel upon the main vessel which may have a neck of any diameter within the limit of the said spring action.

5. An overflow device for cooking vessels, comprising a receptacle formed with an opening in the bottom thereof, surrounded by an upturned flange, a flat inwardly extending ring on the top of said flange to engage against the top of the neck of said cooking vessel, and a number of springs spaced along the inner face of said upturned flange, to engage against the sides of the neck of said cooking vessel to securely attach and center the overflow device upon the cooking vessel, which may have a neck of any diameter within the limit of the said spring action.

In testimony whereof I have affixed my signature.

JOHN BARRON.